US005383102A

United States Patent [19]

Jones

[11] Patent Number: 5,383,102

[45] Date of Patent: Jan. 17, 1995

[54] ILLUMINATION APPARATUS AND REFLECTION CONTROL TECHNIQUES

[75] Inventor: Peter W. J. Jones, Belmont, Mass.

[73] Assignee: Tenebraex Corporation, Boston, Mass.

[21] Appl. No.: 981,375

[22] Filed: Nov. 25, 1992

[51] Int. Cl.[6] .................... B60Q 1/00

[52] U.S. Cl. .................... 362/61; 362/290; 362/354

[58] Field of Search .................... 362/61, 290, 342, 354

[56] References Cited

U.S. PATENT DOCUMENTS

| | | | |
|---|---|---|---|
| 858,968 | 7/1907 | Evans | 362/290 |
| 1,680,037 | 8/1928 | De Tartas | 362/61 |
| 1,893,174 | 1/1933 | Labreche | 362/290 |
| 3,487,206 | 12/1969 | Dawson et al. . | |
| 3,919,543 | 11/1975 | Noren | 362/290 |
| 4,342,821 | 8/1982 | Galves et al. | 430/12 |
| 4,506,953 | 3/1985 | Shimizu et al. | 350/276 |
| 4,558,401 | 12/1985 | Tysoe | 362/290 |
| 4,729,075 | 3/1988 | Brass | 362/342 |
| 4,772,096 | 9/1988 | Kai et al. | 350/276 |
| 4,772,097 | 9/1988 | Takeuchi et al. | 350/319 |
| 4,807,094 | 2/1989 | Mateos et al. | 362/290 |
| 4,929,055 | 5/1990 | Jones | 350/276 |
| 5,149,191 | 9/1992 | Lewin et al. | 362/354 |

*Primary Examiner*—Richard A. Bertsch
*Assistant Examiner*—M. Kocharov
*Attorney, Agent, or Firm*—Robert F. O'Connell; Peter F. Corless

[57] ABSTRACT

The present invention relates to improved light devices, such as illumination or signal devices used on vehicles for managing the light reflections from reflective surfaces of such devices. In one exemplary embodiment thereof, a light device includes an array of tubular elements partially embedded in a reflective surface, such as a surface of a lens of said device, which lens focuses, directs or disperses light from the device. The use of such an embedded array of tubular elements causes the light source to appear as a substantially opaque surface when the light device is not operative and permits an effective amount of light to be projected from the light device when the device is operative.

26 Claims, 13 Drawing Sheets

ILLUMINATION APPARATUS AND REFLECTION CONTROL TECHNIQUES

BACKGROUND OF THE INVENTION

1. Introduction

The present invention relates generally to improved illumination apparatus and methods for control of light reflections from reflective surfaces. In one preferred aspect, the invention relates to illumination apparatus such as used on motor vehicles that can present a more aesthetically pleasing appearance and that can more effectively manage the reflection of incident light than previously known devices.

2. Background of The Invention

In the styling of vehicles, such as automobiles, it is often desirable to integrate the various kinds of lights that must appear thereon into the overall design of the vehicle. These lights such as illumination lights, e.g., headlights or back-up lights, or signal lights, e.g., tail lights, side lights, or turn signal indicators, traditionally have a bright, reflective appearance, and sometimes have a colored appearance, such as a red or yellow color, e.g., colors often used for signal lights. Even when the light is turned off and it is not operative for performing its illumination or signaling function, these bright and/or colored areas on an automobile, for example, call undue attention to themselves or produce a considerable, and often unpleasing, contrast with the color of the rest of the vehicle. From a aesthetic design point of view, such factors are often not desirable.

At present the only known practical ways either to suppress the undesired brightness or color of such vehicle lighting or to match the color of the lights to the body color of the vehicle are to retract the lights into the vehicle's body or to hide them behind a panel, or other suitable cover, when they are not in use, e.g., when headlights are not used during the day. Alternatively, a very dark lens may be used as the output lens of the light or the lens may be covered with a very dark gray filter, as is often done with tail lights, to provide a solid, dark appearance and contrast with the body color of the vehicle.

These techniques clearly have some disadvantages. In the case of the use of retracting lights or cover panels there are the mechanical complexities involved, as well as the added weight and cost of the various mechanisms used. In the case of the use of very dark lenses or filters, there is the problem of the diminution of the light output and the need to use a higher wattage lamp in order to regain a part of the illumination output that is lost.

Accordingly, it is highly desirable to devise effective and more economical techniques for providing a lighting device which will appear as an opaque surface when turned off, but which still functions efficiently as an illumination or signal device when turned on.

Further, such illumination or signal devices often contain one or more lenses or other reflective surfaces. For example, motor vehicle lights typically contain a rear reflector plate positioned behind the light source that assists the light transmission outwardly through a forward lens. The forward lens of a motor vehicle light can also reflect external incident light, e.g., sunlight, moonlight or starlight, or artificial light such as light from the lights of other motor vehicle or electric lights present in the environment, especially from the facets or lens-like elements at the rear surface of the lens which elements provide the desired light beam pattern.

Such reflections may be of serious concern or even be dangerous, for example in military vehicles where such reflections can reveal the position of a vehicle to an enemy. For instance, a motor vehicle illumination device such as a headlight, even though not in operation, can reflect sunlight, moonlight or starlight and expose an otherwise camouflaged vehicle's location. Also scanning devices that rely upon reflections of incident beams, such as laser beams, have been used to locate such vehicles.

Prior techniques for reducing such reflections have included covering of the motor vehicle lights during the daytime by a suitable non-reflective material or, in some cases, smearing the light with mud or dirt or other debris to at least partially reduce the reflective nature thereof. Such techniques are inconvenient and are often not effective or can easily be forgotten in hectic situations such as under battle conditions.

Another useful means for reducing light reflections from reflective surfaces has been disclosed in my U.S. Pat. No. 4929055, issued on May 29, 1990, which is incorporated herein by reference. Such technique, if used internally, while generally reducing most reflections from an external light source that are mostly due to the rear reflecting surface of a light device, does not reduce the remaining reflections from the front and rear surfaces of the forward lenses of the device. This is because the rear reflective surface of the lens is, in a motor vehicle, typically made up of many small, lens-like or prism-like elements which perform the light concentration, dispersion or beam forming function of the device. These small elements often reflect external incident light present in the environment back to a viewer. Such reflections both de-saturate the apparent color, if any, that such an internal structure may have been painted and also make the light device appear as a bright, easily discernible surface. It is desirable, to devise a technique for more effectively reducing these remaining reflections.

SUMMARY OF THE INVENTION

The present invention provides a novel technique for providing an illumination or signal device, such as a vehicular lighting device, that is more aesthetically pleasing than current devices, in that they are perceived as part of the opaque body of the vehicle when turned off but they still efficiently perform their illumination or signal functions when turned on.

More particularly, in one embodiment of the invention, a structure comprising a plurality of tubular elements is positioned within the device, which device contains a plurality of reflective surfaces. Preferably the tubular elements are at least partially embedded, or positioned, within one of the reflective surfaces. Typically the reflective surface in which the tubular elements are embedded is a part of a light transmitting substrate, i.e., an essentially transparent or translucent substrate, such as a plastic or glass lens, used for focusing, directing and/or dispersing light from the device. The tubular elements each have a selected cross-sectional configuration and preferably form a grid-like, or honeycomb-like, or other similar structure.

In a particularly preferred embodiment of the invention, such tubular elements are at least partially embedded in a clear or colorless forward lens of a vehicle illumination or signal light. Such tubular elements are preferably colored, for example, the same color as the adjacent body portion of the vehicle. It has been found that by using tubular elements which are so colored, when the light is turned off, a viewer can not readily discern the light device itself with its array of tubular elements, but rather a viewer perceives the light device effectively as having an opaque surface of the same color as the adjacent vehicle body surfaces so that the light and the adjacent surfaces appear to blend so as to form what appears to be a continuous opaque surface. However, when the light is turned on, it effectively produces the desired illumination substantially as if the embedded tubular elements were not present.

In a further embodiment of the invention, an optical device such as a light device, contains an array of tubular elements positioned behind a front reflective surface thereof, such as the front lens thereof, and the front lens is positioned so that it is tilted with respect to a ground plane. Accordingly, when the lens is tilted downwardly, reflections from the front lens surface due to light from an external source are directed downwardly into the ground.

Other aspects and advantages of the invention are disclosed and discussed below.

It is intended that references made herein to light reflections includes both reflections and refractions of light.

DETAILED DESCRIPTION OF THE INVENTION

Figure 1:
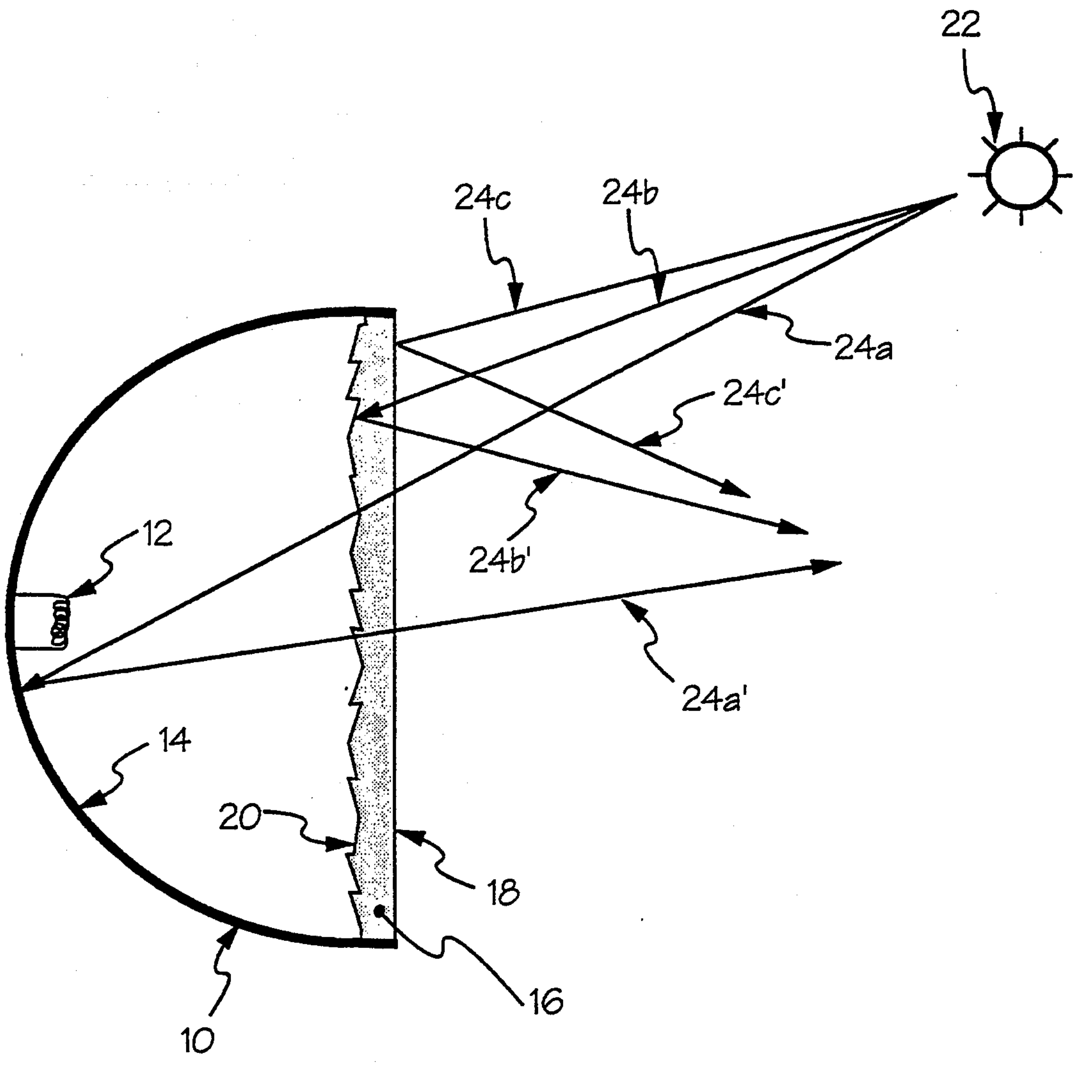
FIG. 1 depicts the geometry of a typical situation in which reflections from an exemplary illuminating device having a plurality of reflective surfaces can occur.

It has been found that for a device that contains a plurality of reflective surfaces, each such surface can reflect incident light from a light source in front of the device. For example, motor vehicle headlight apparatus 10, shown in FIG. 1 of the drawings, contains light source 12, rear reflector plate 14 and front lens 16. Lens 16 has in effect two reflective surfaces, a lens front surface 18 and a lens rear surface of light dispersing elements 20. Elements 20 are commonly employed to concentrate, disperse and/or form a beam pattern of light originating from light source 12 and reflector plate 14. As is known in the art, elements 20 can be configured in a variety of ways, e.g., the elements can be configured into facets, curved lens-like forms or prism-like forms. Alternatively, elements 20 can together comprise a relatively smooth surface, e.g., elements 20 taken together can form a smooth curved rear surface of a lens.

As shown in FIG. 1, incident light rays **24*a*, 24*b* and 24*c* from light source 22, e.g., from an external light source such as the sun, can give rise to three distinct reflected rays, namely, reflected light rays 24*a*', 24*b*' and 24*c*'**.

Figure 2:
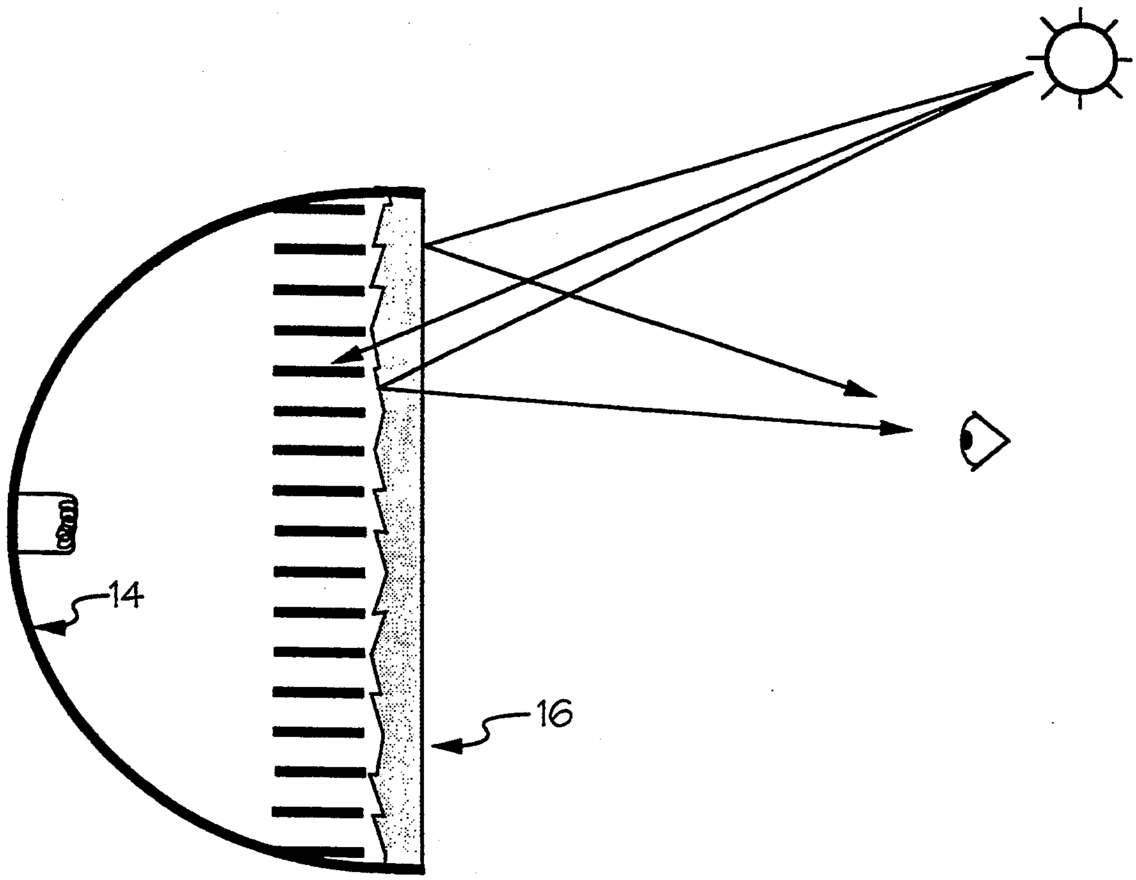
FIG. 2 depicts the device of FIG. 1 wherein an array of tubular elements is positioned in front of a rear reflective surface of the device of FIG. 1 to reduce reflections therefrom.

It is known in my previously issued U.S. Patent referred to above that, if an array of tubular elements is positioned behind the front lens 16 of the device of FIG. 1, as shown in FIG. 2, reflections from rear reflecting surface 14, are considerably reduced. However, the remaining reflections from the front and rear surfaces of the lens therein are not reduced.

I have now further discovered that by at least partially embedding or recessing the array of tubular elements in the lens, light reflections from the rear reflective surface as well as those from the rear surface of the lens can be substantially reduced or essentially eliminated, i.e., reflections from the reflective surfaces of the lens in which the tubular elements are partially embedded as well as reflections from the rear reflection surface positioned behind the tubular elements, i.e., on the side of the tubular elements opposite that of an external incident light source.

Figure 3:
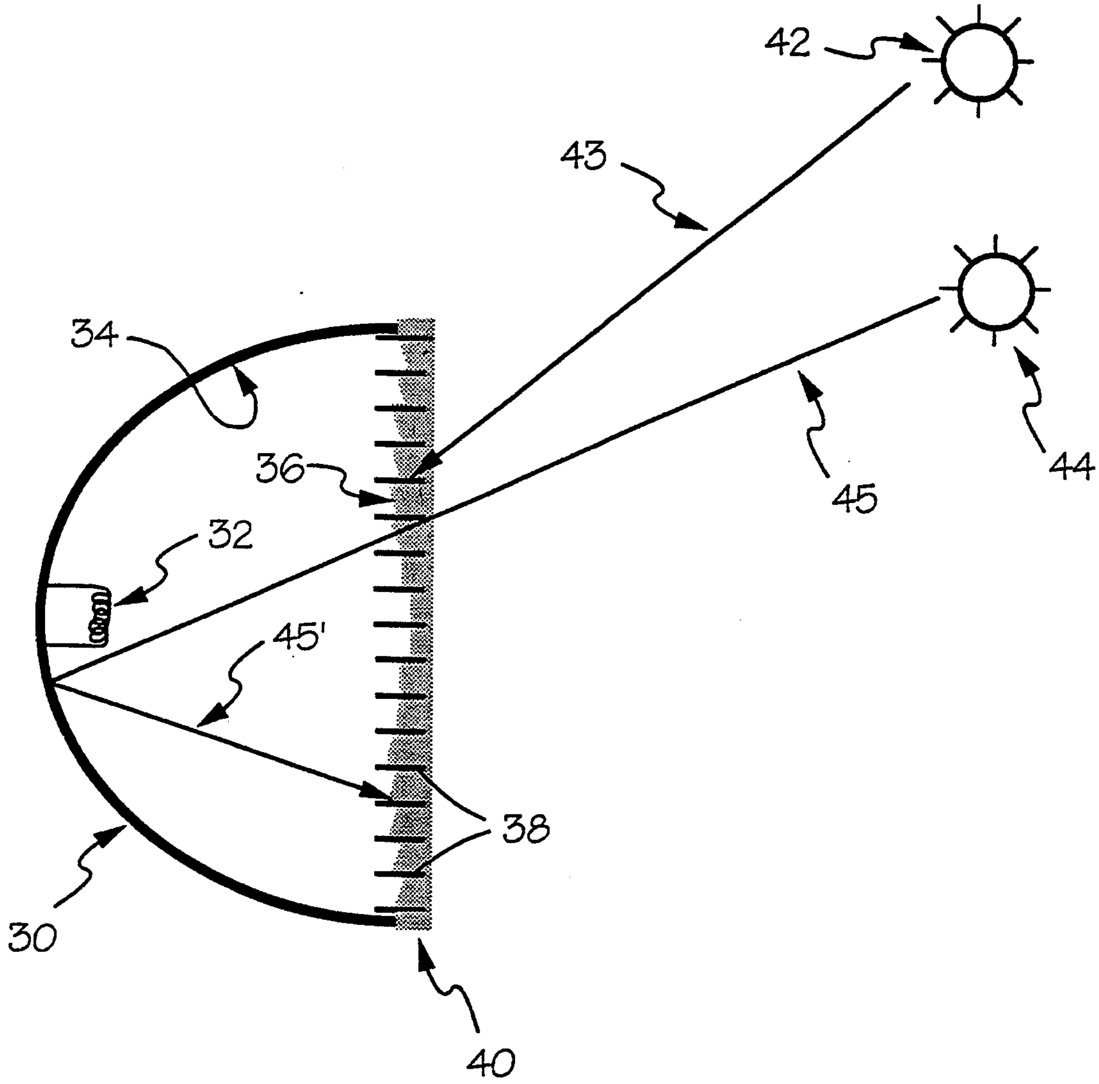
FIG. 3 depicts an embodiment of the invention wherein the tubular elements are partially embedded in forward lens, of the device of FIG. 1.
Figure 3A:
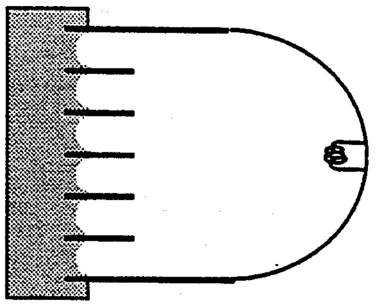
FIG. 3A-3F depict lenses, of the type discussed with respect to FIG. 3, having various types of rear surface configuration.
Figure 3B:
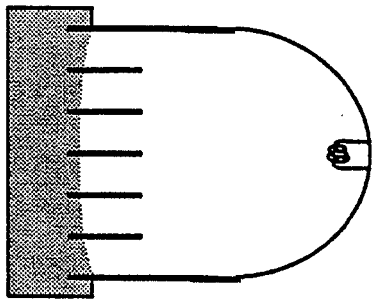
Figure 3C:
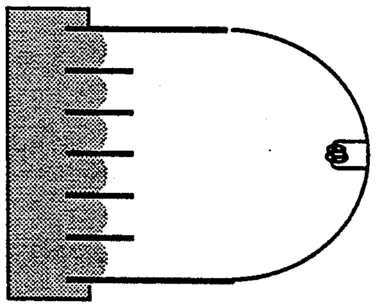
Figure 3D:
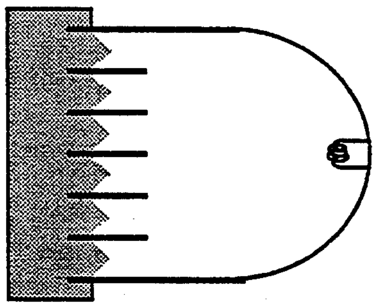
Figure 3E:
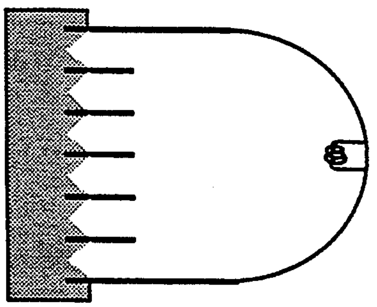
Figure 3F:
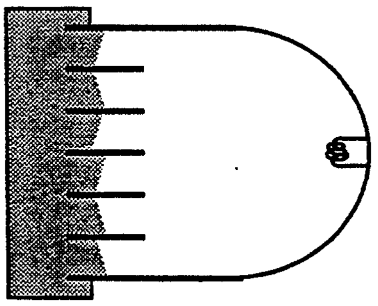

More specifically, reference is made to FIG. 3 which shows an exemplary device 30 that contains a plurality of reflective surfaces and is adapted for use as a motor vehicle headlight. Device 30 is an active light source, i.e., it contains a light element or source 32 which is capable of projecting light from the apparatus. Like the device of FIG. 1, apparatus 30 contains several reflective surfaces including rear reflector plate 34 and a lens 40 having a layer of light dispersing elements 36. An array of tubular elements 38 is at least partially embedded into the rear surface elements 36 of lens 40, or, expressed alternatively, the light dispersing elements 36 are in effect partially recessed into the tubular elements. Preferably only portions of the lengths of elements 38 are embedded in lens 40 as shown in FIG. 3, although in some cases elements 38 may be fully embedded in the lens. Fully embedded tubular elements are those wherein the entire length of each tubular element of an array is substantially encased within the body of the lens.

Preferably, and as depicted in FIG. 3, for a device that contains a plurality of reflective surfaces the tubular elements are at least partially embedded in the substrate, i.e., the lens, that is most proximate to the source of external incident light 44.

Such embedded tubular elements quite effectively reduce or eliminate the transmission of light reflections from an external light source outside the field of illumination of device 30. For example, as shown in FIG. 3, incident light rays 43 and 45 from light sources 42 and 44 are not reflected outwardly from apparatus 30, but rather incident ray 43 is blocked by the walls of elements 38, and reflected ray 45' is projected into the walls of elements 38. It should be appreciated that in the case of partially embedded tubular elements, the embedded portion of the elements serves to shield both the internal rear reflective surface 34 from light-rays from an external source and also to reduce or eliminate outward transmission of reflections from the reflective lens-like elements in which the tubular elements are embedded. The protruding, or non-embedded, portion of the tubular elements serves to reduce or eliminate outward transmission of reflections from internal reflective surfaces, such as rear reflector plate 34 depicted in FIG. 3.

Tubular elements 38 can be readily embedded or recessed into the reflective surfaces of a lens during manufacture thereof as will be apparent to those skilled in the art. Alternatively, an array of tubular elements and a reflective surface can be fitted together after separate manufacture of each item.

As discussed above, the light dispersing elements of a reflective surface such as a lens, e.g. elements 36 in FIG. 3, can have a variety of shapes, exemplary alternative shapes being depicted in FIGS. 3A, 3B, 3C, 3D, 3E and 3F. In the manufacture of a reflective surface, it may be desirable to use an array of tubular elements as a type of mold and form the single light dispersing elements in the apertures of the tubular elements.

Figure 4:
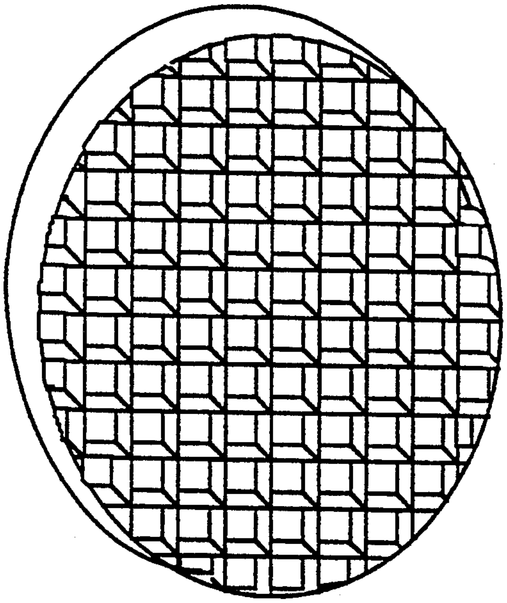
FIG. 4 depicts a particular exemplary embodiment of an array of tubular elements for use in accordance with the invention.
Figure 4A:
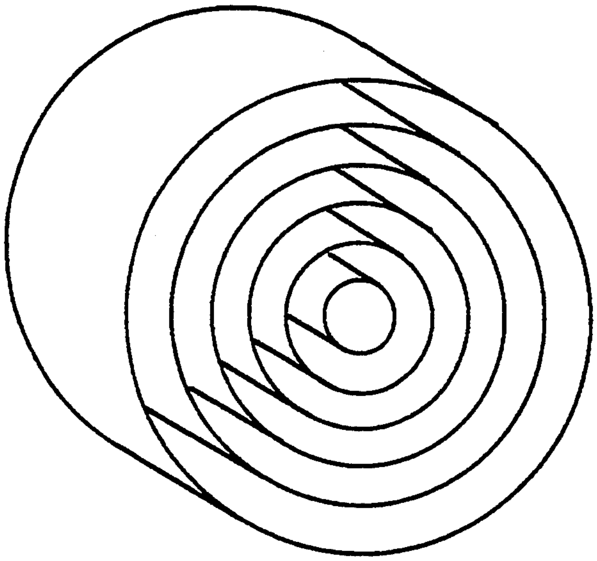
FIGS. 4A and 4B depict other particular exemplary embodiments of an array of tubular elements for use in accordance with the invention.
Figure 4B:
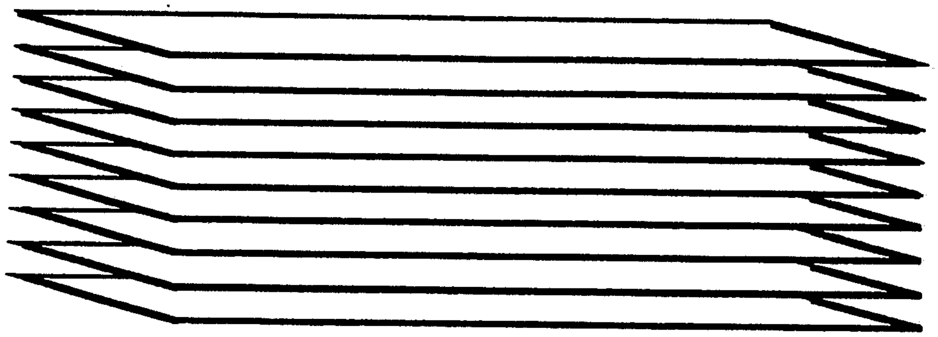

Suitable tubular elements and the general use thereof are generally disclosed in U.S. Pat. No. 4929055. As used herein the term tubular element is deemed to mean an element of a generally tubular configuration having any selected geometrical shape. Although in the configuration of tubular elements as depicted in FIG. 4 the elements are essentially square in cross-section, other shapes can be used, e.g., other rectangular configurations, a triangular configuration, a hexagonal configuration, or the like, as long as such elements are capable of being nested together to form a structure that inhibits transmission of reflected light as contemplated herein. In still further exemplary embodiments tubular the elements may be in the form of concentric circular elements as depicted in FIG. 4A. The elements may also use parallel vanes extending in only one direction, e.g., horizontal vanes which extend across the entire diameter of the lens, as shown in FIG. 4B. Further, while it is typically preferred that the tubular elements are positioned to be substantially orthogonal to the reflective surface in which they are used, it may also be desirable to arrange them so that the planes 50 and 51 of the front or rear, respectively, of the tubular array e.g., as shown in FIG. 3, are not perpendicular to the longitudinal axes of the tubular elements of the array.

In a preferred aspect of the invention the embedded tubular elements in an illumination device as shown in FIG. 3, for example, are colored as desired. It has been found that by coloring the tubular elements, particularly when such tubular elements are partially embedded in a transparent or translucent lens structure, a viewer perceives the lens of the device as effectively having the appearance of an opaque surface of essentially the same color as the tubular elements. In the case of a device that contains an active light source that has one or more substantially transparent or translucent lenses, such as a motor vehicle headlight, the device thus may not be readily seen, when the light source is non-operative or turned off, i.e. it appears as an opaque surface which blends or contrasts with the portions of the opaque vehicle body surface which surround it, depending on the color selected for the elements. Thus, when light is not being transmitted from the device, the apparatus is perceived essentially as such an opaque surface. In a preferred embodiment, substantially or essentially all of the surfaces of the tubular elements are of the same desired color. It is possible that the tubular elements may be made to have a desired color prior to or after integration of the elements into an illumination device. Alternatively, the material of which the tubular elements is constructed may be the desired color to begin with.

Alternatively, the surfaces of the elements may be selectively colored with different colors so as to depict a desired pattern of colors. For example, the elements may be patterned to depict the name of an automobile model or manufacturer, to depict a desired pictorial design, abstract design or other pattern, e.g., a pattern which matches an adjacent grill element of an automobile in the case of headlights.

In determining the extent to which the tubular elements are embedded in the lens structure, one must take in account both the amount of illumination that is desired to be projected from the device when the device is turned on and the extent to which it is desired that the array of tubular elements be made to appear as an opaque surface, e.g., to blend into the surrounding portions of the vehicles surfaces. As the beam forming elements of the lens are more deeply recessed behind the front surfaces of the tubular elements, the amount of output illumination tends to decrease, although the perception of the lens as an opaque surface is enhanced. On the other hand, as the beam forming elements of the lens are less deeply recessed behind the front surfaces of the tubular elements, the illumination tends to increase, while there tends to be an increase in the reflection of ambient light from such beam forming elements and, thus, a reduction in the perception of the lens as an opaque surface.

In any particular application, a practical compromise can be made as to the depth to which the elements are to be embedded in accordance with the desired importance of each of such aspects of the device. In a still further compromise, for example, if it is desired to enhance the apparent opacity of the device as much as possible, while maintaining as high a degree of illumination as possible, it may be necessary to embed the elements to as great a depth as possible, i.e., to recess the beam forming elements as deeply as possible behind the front surfaces of the tubular elements, for the former purpose and to increase the power of the light source for the latter purpose.

In one exemplary embodiment of the invention wherein an array of tubular elements is embedded in the rear surface of a front lens for a motor vehicle headlight, as shown in FIG. 3, the width of the openings of an exemplary array of square-shaped tubular elements (such as shown in FIG. 4) can be about 1/8 inch, the length of the portion of each tubular element embedded in the front lens can be about 1/8 inch, and the length of the portion of each tubular element extending backward from the front lens (i.e., the non-embedded portion) can be about 3/8 inch. Such embodiment represents an exemplary practical arrangement to provide an effective comprises between the desired apparent opacity of the lens and the desired illumination therefrom.

Figure 5:
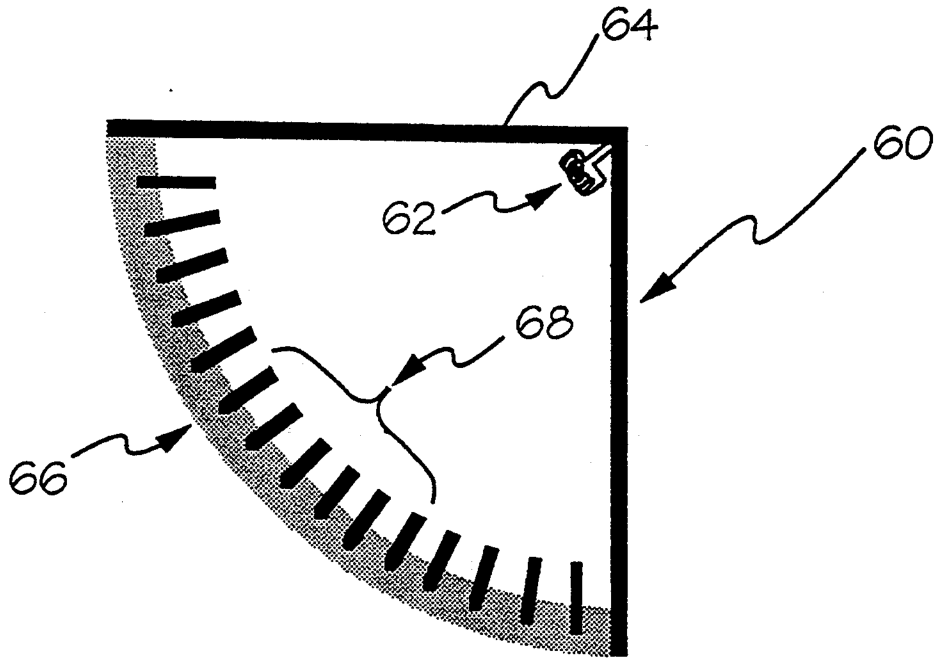
FIG. 5 depicts an exemplary embodiment of the invention wherein an array of tubular elements is partially embedded in a curved reflective surface of an illuminating device.

Tubular elements also may be embedded, or preferably partially embedded, in a curved reflective surface, as well as in a substantially planar reflection surface of the type shown in FIG. 3, to achieve the desired opacity. For example, FIG. 5 shows a motor vehicle sidelight 60 which has a light element or source 62 mounted on a plate 64 and curved front lens 66. Tubular elements 68 are partially embedded in curved front lens 66. As shown therein the walls or vanes of elements 68 are arranged in a non-parallel manner, particularly in the embodiment shown so as to be radially positioned with respect to light source 62 and the openings thereof are, in effect, parallel to the rays of light which are generally radially directed from the source.

In summary, it has been found that a motor vehicle light device, such as an illuminating light, e.g., headlight, back-up light, tail light or side light, or a signal light, e.g., a stop light, a turn signal indicator, can be fitted with colored tubular elements as described above and the light will be perceived as an opaque body part of the vehicle when the light is turned off and will perform its normal lighting function when the light is turned on. The tubular elements can be the same or different color than the surrounding body portions of the vehicle, or they can provide a colored pattern, as may be desired.

In another aspect of the invention, the output light from the device, when the light device is turned on, may be required to have a particular color, e.g., a yellow color as from a signal light, while the array of tubular elements may be required to have another different color which is selected to provide the desired appearance of a different colored opaque surface when the light device is turned off. In such a case, the appropriate colored array of tubular elements is embedded into an essentially clear or uncolored lens and the light source may be selected to provide the desired color when turned on or an appropriate color filter may be placed behind the array of tubular elements to do so.

In another aspect of the invention it has been known, for example, to place a dark filter in front of a motor vehicle light to reduce the reflection of incident light from the device and to provide an aesthetically pleasing "black-out" effect. In order to provide such a "black-out" effect, however, such prior used filters typically have been quite dark, e.g., a dark gray, and consequently have impaired the light output of the device, often necessitating the use of a much more powerful light source.

Use of embedded tubular elements in accordance with the present invention however, overcomes such problems of prior systems by substantially reducing the reflections of incident light from a light device so as to enable a much lighter colored filter, e.g., a light gray filter to be used, so that the device can provide the desired "black-out" effect without greatly impairing the light output therefrom and a light source having the same or only slightly higher power can be used. The filter may be positioned in front or behind the lens, or the lens itself may be tinted a light gray.

Figure 6:
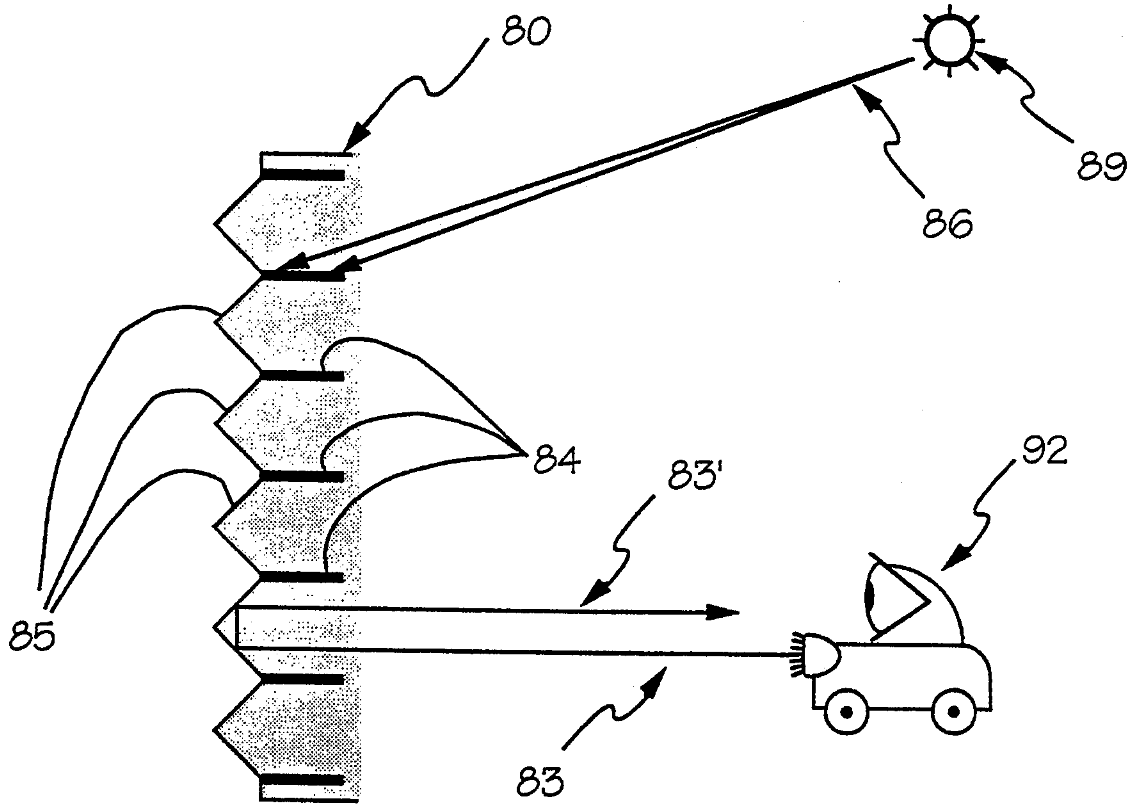
FIG. 6 depicts an exemplary embodiment of the invention as used in a retro-reflection device.

The invention will also have utility in reducing unwanted reflections from a retro-reflector, such as those frequently used for purposes of safety on automobiles or other vehicles. In operation, retro-reflectors are intended to return a relatively bright reflection of a light source which lies close to an observer's position, e.g., a headlight of an observer's car 92, over a relatively wide angle of incidence to the surface. For example, as shown in FIG. 6, a safety retro-reflector 80 is specifically intended to reflect light rays, e.g., from an observer's headlights, that strike the retro-reflector 80, back to the observer, as shown by rays 83 and 83'.

However, other undesirable reflections, as from a light source out of the field of view of the device, can be reduced by use of an array of tubular elements in accordance with the present invention. Referring to FIG. 6, an array of tubular elements 84 is integrated into retro-reflector 80. Tubular elements 84 permit reflections from reflector elements 85 of incident light 83 or, in other words, light from a source positioned within the field of view of adjacent tubular elements. However, tubular elements 84 substantially reduce or essentially eliminate reflections from off-axis light such as incident light 86, e.g., environmental day light from a source 89 such as sunlight, positioned outside the field of view of adjacent tubular elements. In a manner similar to that described above, if the reflected output from the retro-reflector is desired to have a selected color, e.g., red or yellow, a suitable color filter can be positioned behind the array of tubular elements so that the reflection therefrom can have the desired color, while the color of the tubular elements may be selected to produce a perceived opaque surface of a different color.

Further, it has been found that the use of an array of tubular elements in accordance with the present invention can effectively reduce or eliminate reflections from a rear reflective surface positioned behind the tubular elements, or from the reflective surface of the front lens if the tubular elements are embedded therein. However, reflections may still occur from the lens, particularly when the array of tubular elements is positioned behind the lens and is not embedded therein, and from the front surface of the lens when the elements are at least partially embedded therein. For example, referring to FIG. 2, tubular elements placed behind the light dispersing elements of a lens may not prevent the direct outward projection of reflected rays from the front and rear surfaces of the lens which arise from an external ambient light source in front of the lens. As a consequence, these latter reflected rays may be observed by a viewer positioned in front of the light device. Since in a military situation such reflection may be enough to identify the location of the front reflecting surfaces, it is desirable to reduce such latter reflections.

Figure 7A:
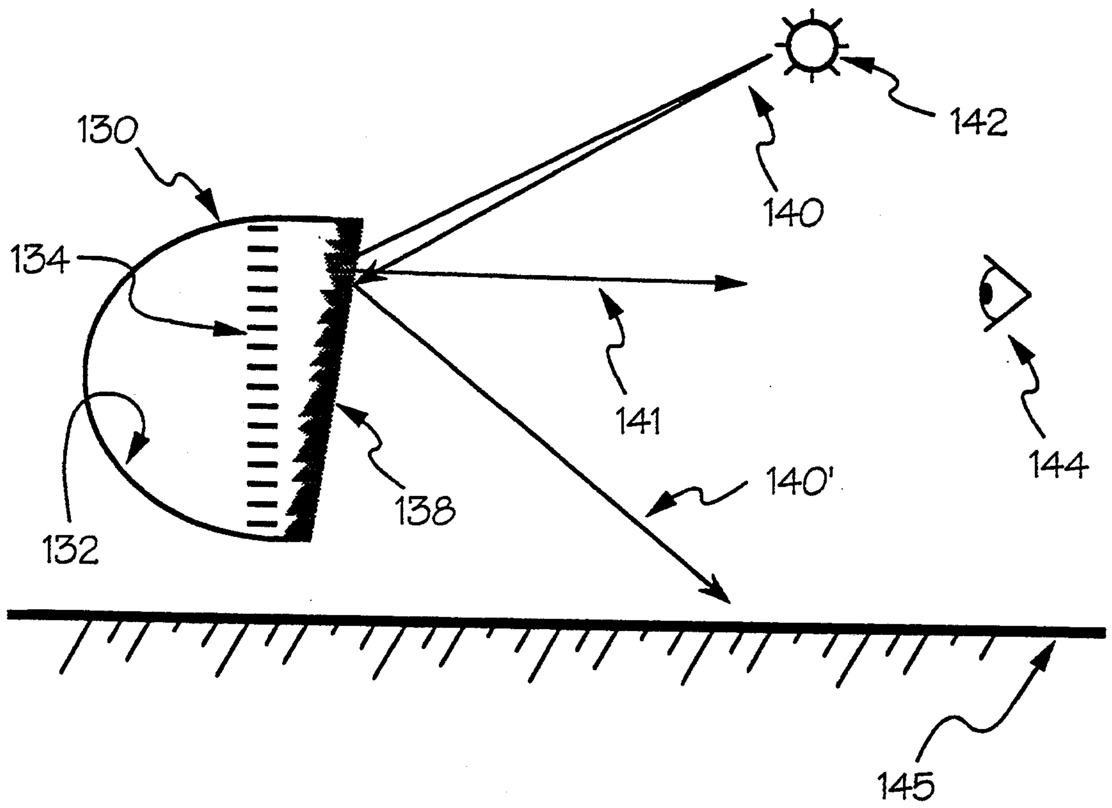
FIGS. 7A-7D depict another embodiment of the invention using a tilted lens in combination with an array of tubular elements.

It has now been found that the projection of the latter reflections to a viewer can be prevented by tilting the lens that is positioned in front of an array of tubular elements. For example, as shown in FIG. 7A, illumination apparatus 130 which comprises a plurality of reflective surfaces, including rear reflector plate 132 and the reflective surfaces of a lens 138, uses an array of tubular elements 134 placed behind the lens and not embedded therein, the device being arranged so that the lens is tilted downwardly with respect to a ground plane 145, as shown. Accordingly, incident light 140 from source 142 is reflected from the front surface of lens 135 downwardly to the ground so that reflected light rays 140 can not be observed by a viewer 144. In some cases, some reflections from the rear surface of lens 135, e.g., ray 141, may be observed by a viewer.

Figure 7B:
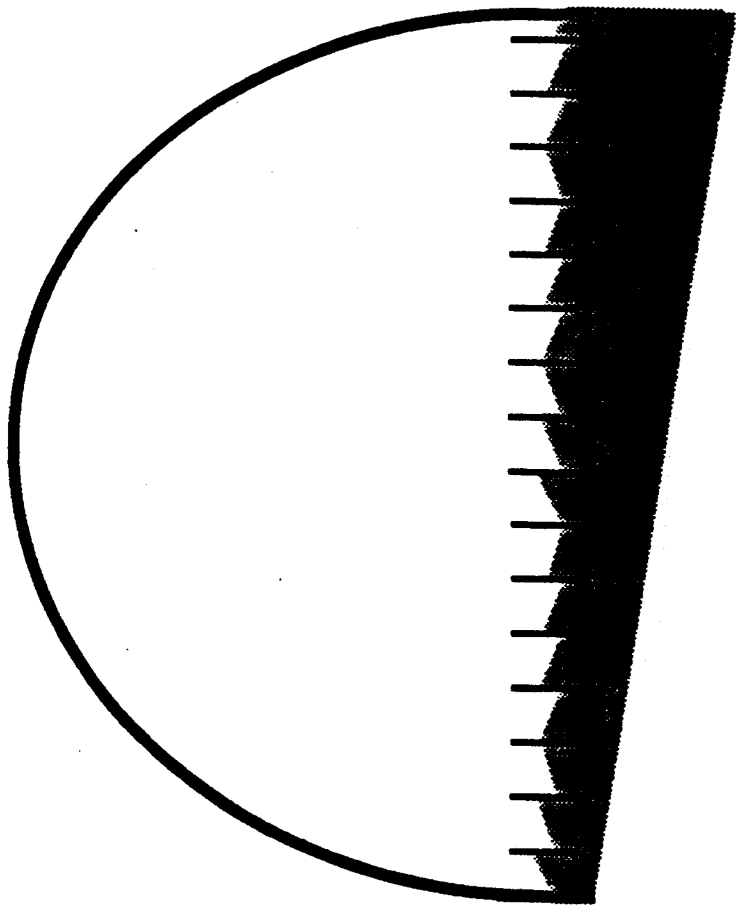
Figure 7C:
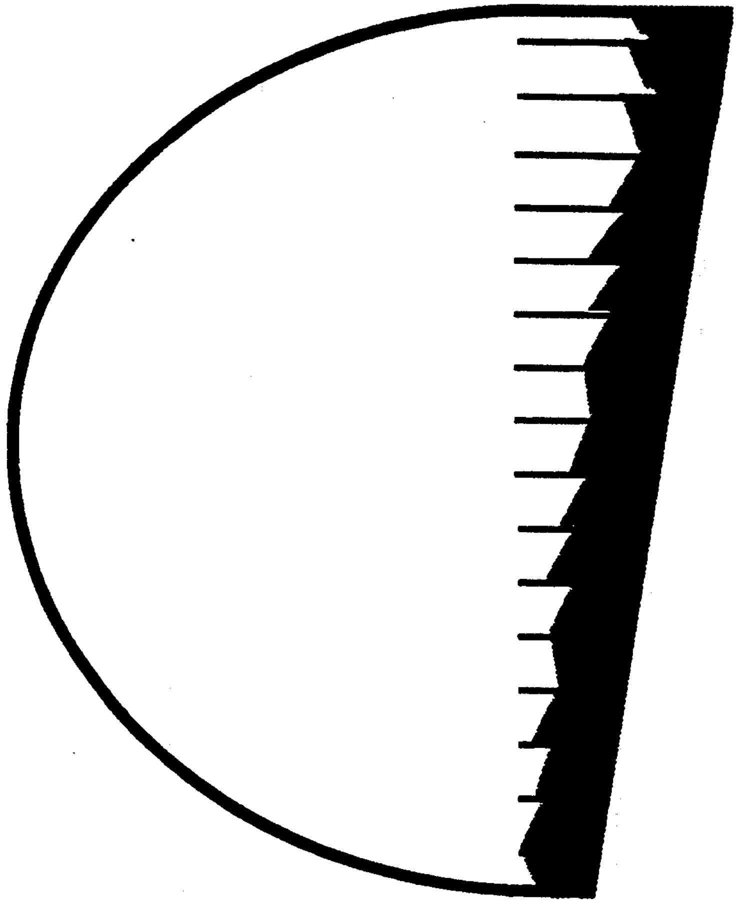
Figure 7D:
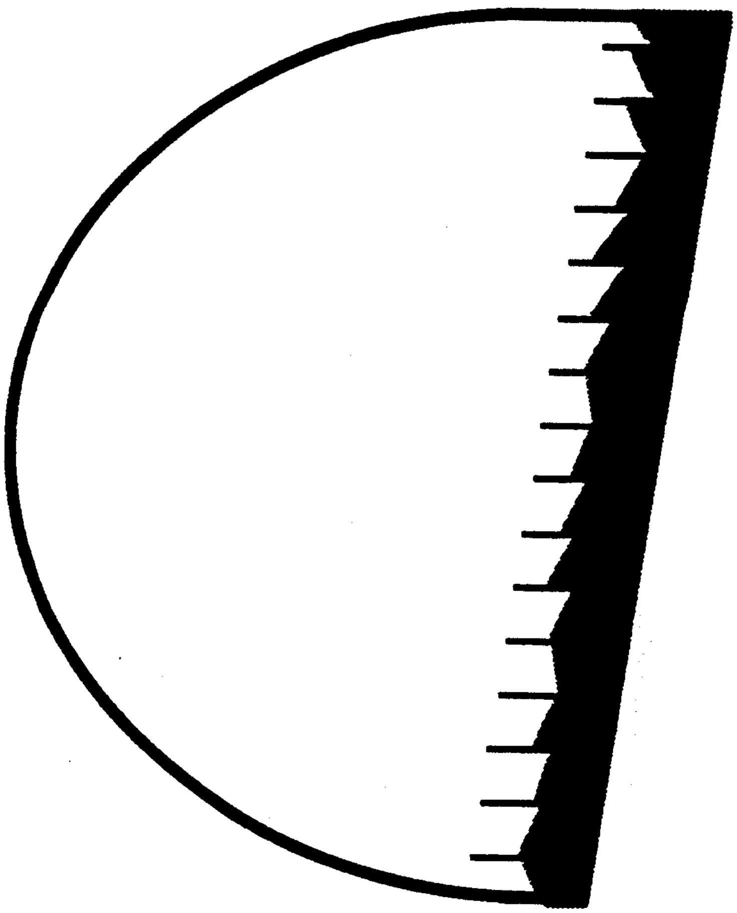

When the elements are partially embedded in the lens, the lens may be formed so that only the front surface thereof is tilted, as in FIG. 7B, the elements being embedded in a non-tilted rear portion thereof. Alternatively, the lens may be tilted, as in FIGS. 7C and 7D and the elements embedded therein so that the plane of either the front or rear surfaces 50 or 51, respectively thereof is at an angle with respect to the longitudinal axes of the elements (FIG. 7C) or the planes of both front and rear surfaces 50 and 51 thereof are at an angle with respect to the longitudinal axis of the elements (FIG. 7D). In each of such cases the tubular elements reduce reflections from the rear surface of the lens and reflections from the front surface thereof are directed downardly.

While less preferred than such downward tilting, there may be other applications wherein the lens may also be tilted upwardly away from the ground plane to reflect light upwardly and thereby also avoid the projection of reflected light to a viewer in front of the lens. Preferably, the tilted lens element which is positioned in front of the array of tubular elements has a substantially or essentially flat front surface to provide the most effective downward or upward reflection of incident light.

While somewhat less preferred than downward or upward tilting, the lens may also may be tilted sideways in some applications to project the reflections to either side of the device.

The foregoing descriptions of various embodiments of the invention are merely illustrative thereof, and it is understood that variations and modifications thereof can be made by those in the art without departing from the spirit or scope of the invention. Hence, the invention is not to be construed as limited thereto, except as defined by the appended claims.

What is claimed is:

1. A light device comprising:

a light source;

a light transmitting lens positioned in front of said light source and having a substantially non-opaque front surface and a light receiving rear surface having a plurality of lens or prism elements, light received from said light source at the rear surface of said lens being transmitted through substantially the entire non-opaque front surface of said lens;

a reflective surface associated with said light source for projecting light from said light source to the rear surface of the lens and outwardly through said lens to be transmitted therefrom;

an array of substantially tubular elements being at least partially embedded in the rear surface of said lens whereby, when said light source is not operative, the front surface of the light device appears as a substantially opaque surface.

2. A light device in accordance with claim 2 wherein said light device is on a vehicle and said tubular elements have at least one selected color such that, when said light source is not operative, the light device appears as a substantially opaque surface of said at least one selected color.

3. A light device in accordance with claim 3 wherein said at least one selected color is either a single color or a pattern of different colors.

4. A light device in accordance with claim 3 wherein said at least one selected color is a single color selected to match the color of body portions of said vehicle adjacent said light device whereby, when said light source is not operative, said light device appears as a substantially opaque surface having a color which blends with the color of said adjacent body portions.

5. A device in accordance with claims 1, 2, 3 or 4, wherein said array of tubular elements is partially embedded into the rear surface of said lens to a selected depth therein for providing a selected opaque appearance of said non-opaque front surface when said light source is not operative and for providing a selected degree of illumination from said light device when said light source is operative.

6. A light device in accordance with claims 1, 2, 3 or 4 wherein said lens is a curved lens and the tubular elements of said array have longitudinal axes which are arranged to be positioned radially with respect to said light source.

7. A light device in accordance with claims 1, 2, 3 or 4 wherein said lens is a substantially planar lens and the tubular elements of said array have longitudinal axes which are substantially orthogonal to said planar lens.

8. A light device in accordance with claim 7 wherein the tubular elements have front and rear surfaces which lie in front and rear planes, respectively, said front and rear planes being perpendicular to the longitudinal axes of said tubular elements.

9. A light device in accordance with claim 7 wherein tubular elements have front and rear surfaces which lie in front and rear planes, respectively, and at least one of said front or rear planes is at an angle with respect to the longitudinal axes of said tubular elements.

10. A light device in accordance with claim 1 wherein the tubular elements of said array have longitudinal axes which are arranged in a non-parallel manner.

11. A light device in accordance with claim 1 wherein the tubular elements have a first selected color such that, when said light source is not operative, the light device appears as a substantially opaque surface of said first selected color and, when said light source is operative, the light device appears as a region of a second selected color.

12. A light device in accordance with claim 11 wherein said light source produces light having said second selected color.

13. A light device in accordance with claim 11 and further including a color filter positioned adjacent said array of tubular elements, said color filter being of said second selected color.

14. A light device in accordance with claim 1 wherein said array of tubular elements are black and said device further includes a light gray color filter positioned adjacent said lens whereby said light device, when said light source is not operative, appears as a substantially black opaque surface.

15. A light device in accordance with claim 1 wherein said array of tubular elements are black and said lens is tinted a light gray color, whereby said light device, when said light source is not operative, appears as a substantially black opaque surface.

16. A retro-reflection device comprising a retro-reflector element having a light transmissive front surface and a light reflecting rear surface having a plurality of lens or prism elements;

an array of substantially tubular elements at least partially embedded in the retro-reflector element at the rear surface thereof for permitting reflections from said light reflecting rear surface of external light arising within the field of view of said tubular elements and for reducing reflections from said light reflecting rear surface of light arising outside the field of view of said tubular elements.

17. A device in accordance with claim 16 and further including a selected color filter positioned behind said array of tubular elements in said retro-reflector element whereby reflections from said retro-reflector element due to a light source substantially in front of said retro-reflector element in the field of view of said tubular elements has the selected color of said filter.

18. A device in accordance with claim 17 wherein said array of tubular elements has a different color from the selected color of said color filter so that when no reflections are occurring from a light source substantially in front of said retro-reflector, said retro-reflector appears as a substantially opaque surface of said different color.

19. A light device comprising:

a light source;

a light transmitting lens positioned in front of said light source and having a substantially non-opaque front surface and a light receiving rear surface having a plurality of lens or prism elements, light received from said light source at the rear surface of said lens being transmitted through substantially the entire non-opaque front surface of said lens;

a reflective surface associated with said light source for projecting light from said light source a the rear surface of the lens and outwardly through said lens to be transmitted therefrom;

an array of horizontal vane elements being at least partially embedded in the rear surface of said lens whereby, when said light source is not operative, the front surface of the light device appears as a substantially opaque surface.

20. A light device in accordance with claim 19 wherein said light device is on a vehicle and said horizontal vane elements have at least one selected color such that, when said light source is not operative, the light device appears as a substantially opaque surface of said at least one selected color.

21. A light device in accordance with claim 20 wherein said at least one selected color is either a single color or a pattern of different colors.

22. A light device in accordance with claim 20 wherein said at least one selected color is a single color selected to match the color of body portions of said vehicle adjacent said light device whereby, when said light source is not operative, said light device appears as a substantially opaque surface having a color which blends with the color of said adjacent body portions.

23. A device in accordance with claim 19 wherein said array of horizontal vane elements is partially embedded into the rear surface of said lens to a selected depth therein for providing a selected opaque appearance of said non-opaque front surface when said light source is not operative and for providing a selected degree of illumination from said light device when said light source is operative.

24. A light device in accordance with claim 19 wherein the horizontal vane elements have front and rear surfaces which lie in front and rear planes, respectively, said front and rear planes being perpendicular to the longitudinal axes of said tubular elements.

25. A light device in accordance with claim 19 wherein the horizontal vane elements have front and rear surfaces which lie in front and rear planes, respectively, and at least one of said front or rear planes is at an angle with respect to the longitudinal axes of said tubular elements.

26. A device comprising a lens having a substantially non-opaque front surface and a light receiving rear surface having a plurality of lens or prism elements, light received at the rear surface thereof being transmitted through substantially the entire non-opaque front surface of said lens; and an array of substantially tubular elements, at least partially embedded in the lens into the rear surface thereof, for reducing reflections of ambient light from the rear surface of the lens without substantially reducing the transmission through the lens of light directed at the rear surface thereof.

* * * * *